US006618773B1

(12) United States Patent
Chang et al.

(10) Patent No.: US 6,618,773 B1
(45) Date of Patent: Sep. 9, 2003

(54) RECEIVING A PARTICULAR IDENTIFICATION FILE AMONG AN ANALOG IDENTIFICATION FILE AND A DIGITAL IDENTIFICATION FILE IN RESPONSE TO A REQUEST TO A DUAL-INTERFACE MONITOR

(75) Inventors: Luke L. Chang, Austin, TX (US); Joe E. Goodart, Pflugerville, TX (US)

(73) Assignee: Dell USA L.P., Round Rock, TX (US)

( * ) Notice: Subject to any disclaimer, the term of this patent is extended or adjusted under 35 U.S.C. 154(b) by 0 days.

(21) Appl. No.: 09/491,072

(22) Filed: Jan. 25, 2000

(51) Int. Cl.$^{7}$ .............................................. G06F 13/14

(52) U.S. Cl. .............................. 710/16; 710/15; 710/8; 710/10; 710/62; 710/104

(58) Field of Search .............................. 345/3.1; 710/8, 710/10, 11, 62, 104, 105, 302, 15, 16; 713/1, 2, 100

(56) References Cited

U.S. PATENT DOCUMENTS

| | | | | | |
|---|---|---|---|---|---|
| 5,036,481 | A | | 7/1991 | Lunsford et al. | 364/708 |
| 5,448,697 | A | | 9/1995 | Parks et al. | 395/162 |
| 5,483,260 | A | | 1/1996 | Parks et al. | 345/156 |
| 5,764,547 | A | | 6/1998 | Bilich et al. | 364/707 |
| 5,910,806 | A | | 6/1999 | Narui et al. | 345/508 |
| 5,917,462 | A | * | 6/1999 | Suzuki et al. | 345/32 |
| 5,943,029 | A | * | 8/1999 | Ross | 345/11 |
| 5,948,091 | A | * | 9/1999 | Kerigan et al. | 710/10 |
| 6,223,283 | B1 | * | 4/2001 | Chaiken et al. | 713/1 |
| 6,263,440 | B1 | * | 7/2001 | Pruett et al. | 340/825.36 |
| 6,314,479 | B1 | * | 11/2001 | Frederick et al. | 709/208 |

OTHER PUBLICATIONS

Video Electronics Standards Association; *VESA Enhanced Extended Display Identification Data Standard: Release A;* Sep. 2, 1999; pp. 1–32.

Darrell M. Hunt and Ronald D. Shaw; *Method And Apparatus For Counter Based Liquid Crystal Display Panel Identification For A Computer;* U.S. Ser. No.: 09/221,915; Filed Dec. 28, 1998. (Copy Not Enclosed), Now U.S. Pat No. 6,219.451.

William F. Sauber; *Video Monitor Multiplexing Cicuit;* U.S. Ser. No.: 09/156,085; Filed Sep. 17, 1998. (Copy Not Enclosed).

Farzad Khosrowpour; *Original Epuipment Manufacturer Identification For Configurable Electronic Hardware;* U.S. Ser. No.: 08/786,007, Filed Jan. 21, 1997 (Copy Not Enclosed).

* cited by examiner

*Primary Examiner*—Ilwoo Park
(74) *Attorney, Agent, or Firm*—Baker Botts L.L.P.

(57) ABSTRACT

The present invention employs two unique identification files associated with the same dual-interface display monitor. Each identification file identifies one of the display monitor's two interfaces, so that each identification file identifies the display monitor as a separate display monitor, with a unique product code and its associated characteristics, to the computer system. When an initiating event occurs, such as a power on self test, hot plug-in, or reboot, the monitor responds to a request for its identification file with the digital identification file if the monitor is connected to the digital video connector and with the analog identification file if the monitor is connected to the analog video connector. If both connectors are connected, the monitor with send the digital identification file as a default. In the preferred embodiment, the identification files are EDID™ files.

38 Claims, 4 Drawing Sheets

RECEIVING A PARTICULAR IDENTIFICATION FILE AMONG AN ANALOG IDENTIFICATION FILE AND A DIGITAL IDENTIFICATION FILE IN RESPONSE TO A REQUEST TO A DUAL-INTERFACE MONITOR

BACKGROUND OF THE INVENTION

1. Field of the Invention

This invention relates to display monitors in computer systems, and more particularly to a method and apparatus of initialization and communication with a display monitor having both an analog and digital interface.

2. Description of the Related Art

Computer systems in general and personal computer systems in particular have attained widespread use for providing computer power to many segments of today's modern society. A personal computer system can usually be defined as a desktop, floor standing, or portable microcomputer that includes a system unit having a system processor and associated volatile and non-volatile memory, a display monitor, a keyboard, one or more diskette drives, a fixed disk storage device and an optional printer. One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses. A personal computer system may also include one or a plurality of I/O devices (i.e. peripheral devices) which are coupled to the system processor and which perform specialized functions. Examples of I/O devices include modems, sound and video devices or specialized communication devices. Mass storage devices such as hard disks, CD-ROM drives and magneto-optical drives and display monitors are also considered to be peripheral devices.

Computer systems, including personal computer systems, are increasingly using dual-interface display monitors. These dual-interface monitors have both a digital interface and an analog interface. The computer system, in order to correctly initialize and communicate with the display monitor, must have a manner of identifying which interface should be used. Traditional single-interface display monitors utilize a file conforming to a standard promulgated by the Video Electronics Standard Association ("VESA"™) to identify itself to the computer system. This standard is known as the Extended Display Identification Data (EDID™) Standard, with a modified version of the standard being referred to as the Enhanced Extended Display Identification Data (E-EDID™) standard. Both the EDID™ and E-EDID™ standards will be referred to herein collectively as "the EDID™ standard" or simply "EDID™".

The EDID™ standard defines a 128-byte data structure that is communicated from the display monitor to the processor. The EDID™ data structure, sometimes referred to herein as an "EDID file", is an identification file that is communicated over a communications channel. As used herein, the term "EDID file" refers to a data structure conforming to either the EDID™ and the E-EDID™ standards. The EDID™ standard assumes that the information contained in the data structure defined by the EDID™ standard will be communicated over a communications channel that incorporates the display data channel (DDC™) standard. The DDC™ communication channel standard, also proposed by VESA™, defines a communications standard by which a computer system having a monitor may exchange device-specific information among the computer and the monitor using bus lines according to a predetermined protocol. Descriptions of the DDC™ communication channel standard, the EDID™ standard and the E-EDID™ standard are available from the Video Electronics Standards Association (VESA™) located in Milpitas, Calif. EDID™ data transmitted over a DDC™ channel can be accessed by an external controller.

Typically, monitor initialization for single-interface display monitors is done during each execution of the computer system's power on self test (POST) procedure and also when a "hot plug-in" occurs. A hot plug-in occurs when a monitor is plugged into the computer system after the system is already powered up and running. A hot plug-in could occur, for instance, when a monitor is unplugged and then re-plugged while the computer is powered up.

During display monitor initialization, the computer system submits a request for EDID™ file to the display monitor. In the preferred embodiment, the request for EDID file includes a clock signal, SCL, and a data signal, SDA. Upon receiving the request, the monitor transitions from a wait state and relays the EDID™ file to the computer system at the appropriate clock interval. The EDID™ file defines the display monitor's name as well as the display monitor's unique properties such as interface type, timing, capabilities, color parameters, and other pertinent information as set forth in the EDID™ standard. Based upon the information relayed from the display monitor to the computer system in the EDID™ file, the computer system can generate the proper initialization process for the display monitor, and can generate the correct video signals, timings, colors and other parameters for transmission to the display monitor.

The typical approach of using a single EDID™ file to be transmitted to the computer system by the display monitor is inadequate for correctly identifying and initializing dual-interface display monitors that include both an analog and a digital interface. Under this approach, the computer system will only recognize one or the other of the display monitor's two interfaces, but not both. This inadequacy is further augmented by the practical limitation that, under a generally accepted approach for initializing display monitors, once a display monitor product identification code is read by the system from the EDID™ file, the computer system's registry is loaded with the information from the EDID™ file and no further changes to that portion of the registry file can be made under the same display monitor product identification code.

SUMMARY OF THE INVENTION

The present invention employs two unique identification files associated with the same dual-interface display monitor. Each identification file identifies one of the display monitor's two interfaces, so that each identification file identifies the display monitor as a separate display monitor, with associated characteristics, to the computer system.

In one embodiment, a method for communicating monitor identification information between a dual-interface monitor and a host computer system is disclosed. The method senses whether an initiating event has occurred. The initiating event can be a power on self test. In an alternative embodiment, the initiating event can be a hot plug-in. In another alternative embodiment, the initiating event can be a reboot.

After the initiating event is detected, a request for identification information is provided to the monitor. In at least one embodiment, this identification request includes a clock signal and a data signal.

The method determines whether both an analog video connector and a digital video connector are connected to the monitor. If so, a default identification file is selected. In at least one embodiment, the default identification file is the digital identification file. The default identification file is provided to the host computer system. If both connectors are not connected to the monitor, then the identification file associated with the active connector (i.e., the connector that is connected to the monitor) is provided to the host computer system.

In at least one embodiment, a product identification code that is included in the identification file (either the default identification file of the particular identification file, depending on which one is provided to the host computer system) is used as an index into a database, the product identification code pointing to an information file associated with the monitor.

In one embodiment, the identification file provided to the host computer system is an EDID™ file. In another embodiment, the identification file is an E-EDID™ file.

The identification files include, in at least one embodiment, a video input definition. The video input definition is used to determine whether the dual-interface monitor should receive analog video input or digital video input.

A computer system that supports the communication of identification information between a host system and a dual-interface monitor comprises a processor, a main memory coupled to the processor, an analog video connector, a digital video connector, a dual-interface monitor, and a program code that is stored in the memory and executable by the processor. The code includes instructions for sensing an initiating event, provided a request for identification information from the monitor, receiving the identification file, and using a video input field within the identification file to determine whether the monitor should receive analog video input or digital video input. In one embodiment, the identification file is and EDID™ file. In an alternative embodiment, the identification is an E-EDID™ file. In a further embodiment, the program code includes instructions for using a product identification code within the identification file as a pointer to an information file corresponding to the monitor.

The monitor included in the computer system includes logic for receiving the request for identification file, determining whether both the analog video connector and digital video connector are connected to the monitor, and providing to the processor a default identification file if both connectors are connected. In at least one embodiment, the default identification file is the digital identification file. In at least one embodiment, default identification file may be an EDID™ file. In an alternative embodiment, the default identification file is an E-EDID™ file. The monitor includes logic for providing, if one but not both connectors are connected, an identification file associated with the connector that is connected. Again, the identification file may be an EDID™ file and may also be an E-EDID™ file.

A computer-readable medium embodying the program code described above may, in various embodiments, include a magnetic storage medium, optical storage medium, non-volatile storage medium, a volatile storage medium, and a data transmission medium.

An apparatus that supports communication of identification information from a dual-interface monitor includes a means for sensing whether an initiating event has occurred, a means for providing a request for identification to a dual-interface monitor, a means for receiving the identification file, and a means for using a video input definition to determine whether the monitor should receive analog video input or digital video input. In at least one embodiment, the apparatus further includes a means for using a product identification code to point to an information file associated with the monitor. In at least one embodiment the apparatus further includes a means for determining whether the monitor is connected to both the analog and digital video connectors, and, if so, for choosing a default identification file and providing the default identification file to a computer system. In at least one embodiment, the apparatus further includes a means of providing the analog identification file to the computer system if the monitor is connected to the analog video connector (but not the digital connector) and for providing the digital identification file if the monitor is connected to the digital video connector (but not the analog video connector). In at least one embodiment, the default identification file, the particular identification file, the analog identification file, and the digital identification file comprise EDID™ files. In another embodiment, they comprise E-EDID™ files. The initiating event may be, in alternative embodiments, a power on self test, a hot plug-in, and a reboot.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of a mode for carrying out the invention. The description is intended to be illustrative of the invention and should not be taken to be limiting.

Figure 1:
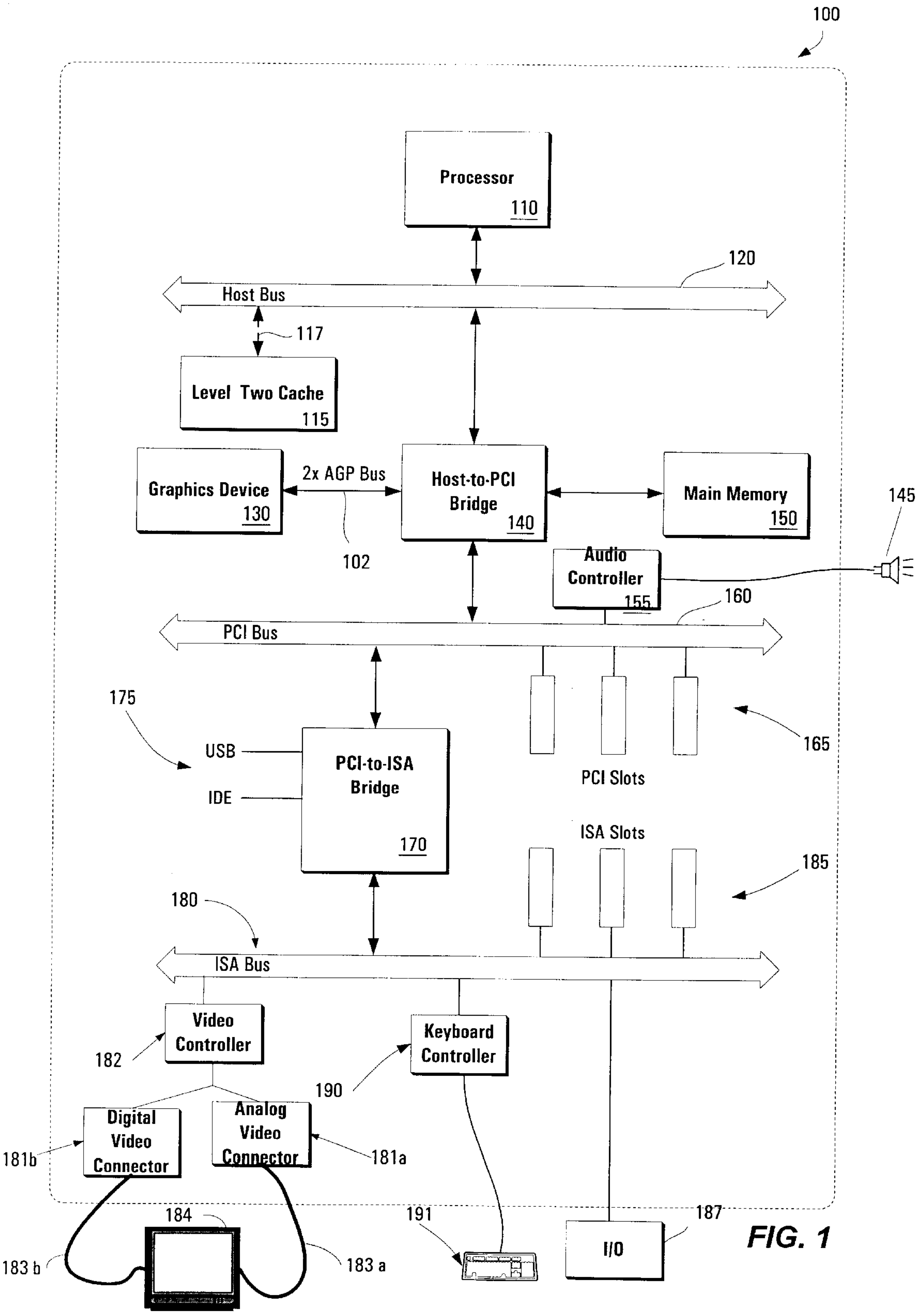
FIG. 1 is a block diagram of a computer system that interfaces with a dual-interface display monitor.

FIG. 1 is a block diagram of an exemplary computer system 100 that interfaces with a dual-interface monitor 184. The computer system 100 may be found in many forms including, for example, mainframes, minicomputers, workstations, servers, personal computers, internet terminals, notebooks and embedded systems. Personal computer (PC) systems, such as those compatible with the x86 configuration, include desktop, floor standing, or portable versions. A typical PC computer system 100 is a microcomputer that includes a microprocessor (or simply "processor") 110, associated main memory 150 and control logic. The computer system 100 interfaces with any of a number of peripheral devices 130, 187, 191, 145 that provide input and output for the system 100.

The processor 110 is coupled to a host or memory bus 120. The main memory 150 is also coupled to the host bus 120. A typical computer system 100 may also include a cache 115 to facilitate quicker access between the processor 110 and main memory 150.

The peripheral devices often include speaker systems 145, keyboards 191, graphics devices 130, display monitors 184, and other traditional I/O devices 187 that often include mouse-type input devices, floppy and hard disk drives, CD-ROM drives and printers. The number of devices being added to personal computer systems continues to grow. For example, many computer systems also include network capability, terminal devices, modems, televisions, sound devices, voice recognition devices, electronic pen devices, and mass storage devices such as tape drives, CD-R drives or DVDs.

Most of the peripheral devices usually communicate with the processor 110 over an input/output (I/O) or expansion bus 180. In the preferred embodiment, the expansion bus 180 is preferably the industry standard architecture or extended industry standard architecture (referred to collectively herein as "EISA") bus 180, although various other types of expansion bus may be used. Not all input/output devices communicate over the expansion bus 180. For instance, a speaker system 145 may be coupled to an audio controller 155 which may in turn be coupled to a PCI bus 160. The buses 120, 160, 180 communicate with each other through the use of one or more bridges 140, 170.

A video controller 182 is connected to the expansion bus 180. The video controller 182 is also connected to at least one video connector. In the preferred embodiment, the video controller is connected to an analog video connector 181*a*, and a digital video connector 181*b*. The connectors 181*a*, 181*b* are capable of being connected to the video monitor 184. The analog video connector 181*a* is connected to the video monitor 184 via an analog video cable 183*a*. The digital video connector 181*b* is connected to the video monitor via a digital video cable 183*b*.

One skilled in the art will recognize that the foregoing components and devices are used as examples for sake of conceptual clarity and that various configuration modifications are common. For example, the audio controller 155 is connected to the PCI bus 160 in FIG. 1, but may be connected to the ISA bus 180 or other appropriate I/O buses in alternative embodiments. As further example, processor 110 is used as an exemplar of any general processing unit, including but not limited to multiprocessor units; host bus 120 is used as an exemplar of any processing bus, including but not limited to multiprocessor buses; PCI bus 160 is used as an exemplar of any I/O bus; AGP bus 102 is used as an exemplar of any graphics bus; graphics device 130 is used as an exemplar of any graphics controller; and host-to-PCI bridge 140 and PCI-to-ISA bridge 170 are used as exemplars of any type of bridge. Consequently, as used herein the specific exemplars set forth in FIG. 1 are intended to be representative of their more general classes. In general, use of any specific exemplar herein is also intended to be representative of its class, and the non-inclusion of such specific devices in the foregoing list should not be taken as indicating that limitation is desired.

Figure 2:
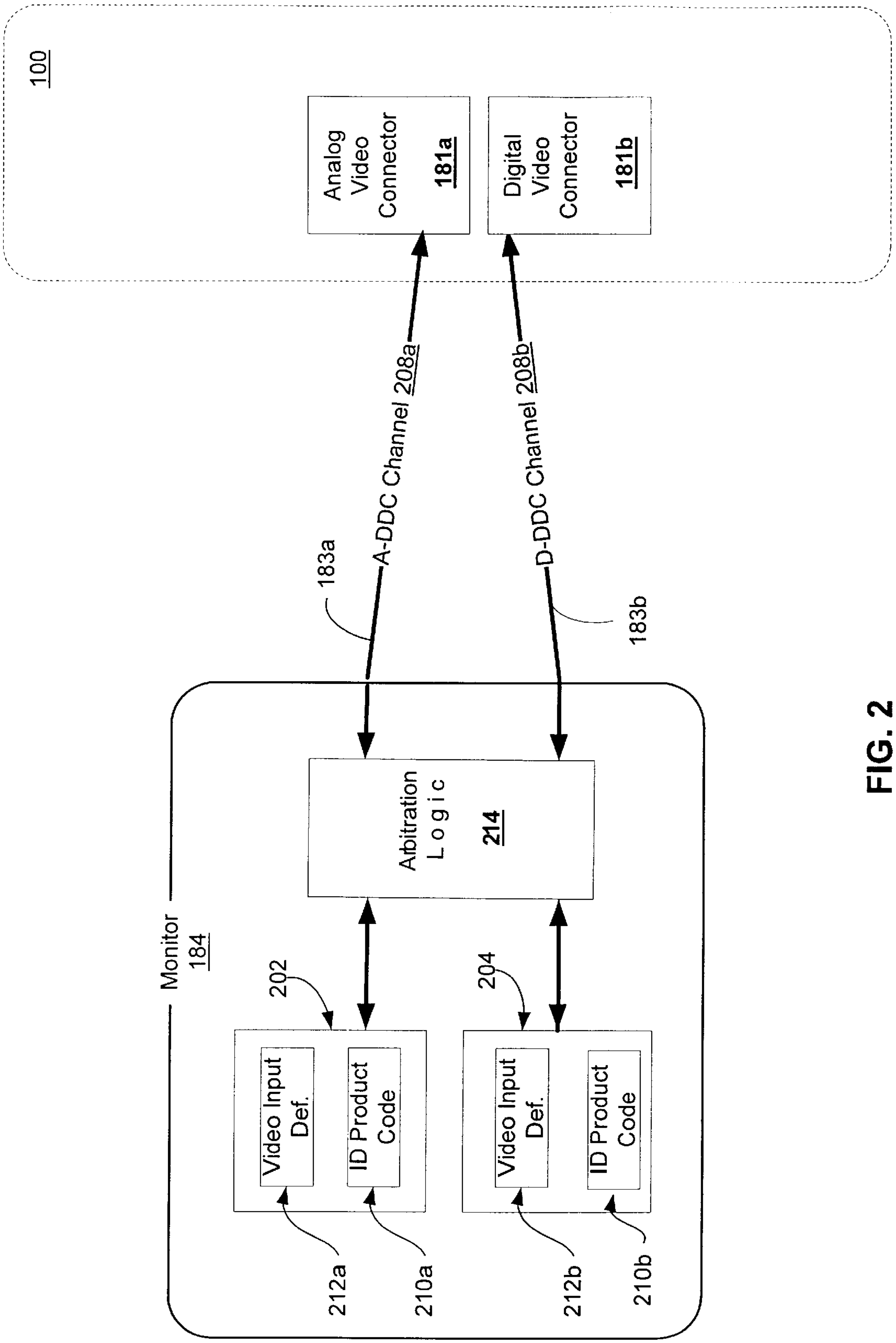
FIG. 2 is a block diagram of a dual-interface display monitor.

FIG. 2 illustrates a dual-interface display monitor 184. The monitor 184 is coupled to a video cable 183. In the preferred embodiment, the monitor is coupled to either an analog video cable 183*a* or a digital video cable. 183*b*. The analog video cable 183*a* is configured to connect with an analog video connector 181*a*. The digital video cable 183*b* is configured to connect with a digital video connector 181*b*. The coupling of the analog video cable 183*a* with the analog video connector 181*a* results in a DDC™ channel 208*a* that carries DDC™ data from an analog monitor interface. Similarly, coupling of the digital video cable 183*b* with the digital video connector 181*b* results in a DDC™ channel 208*b* that carries DDC™ data from a digital monitor interface. In the preferred embodiment, the cable 183 may be connected to either the analog video connector 181*a* or the digital video connector 181*b* at any one time, but not both. In other words, only one DDC™ channel 208 exists at any one time for purposes of relaying EDID™ information from the monitor 184. In an alternative embodiment, the cable 183 may be connected to a single dual-purpose analog/digital connector (not pictured). In a second alternative embodiment, both the analog and digital video connectors may be connected to the monitor 184 at one time.

The monitor 184 includes DDC logic 214 for asserting EDID™ signals across the DDC™ channel 208*a*, 208*b* to the computer system 100. The DDC™ channel 208*a*, 208*b* provides a communication channel through the video cables 183*a*, 183*b* and video connectors 181*a*, 181*b* for allowing communication between the monitor 184 and the computer system 100. The DDC™ signals may be either unidirectional or bi-directional as desired.

The monitor 184 employs two distinct EDID™ files 202, 204 that contain different information and a unique ID product code XX for each of the distinct files The monitor 184 includes both an analog EDID™ file 202 and a digital EDID™ file 204 (that is, one for each interface) to identify each interface as a unique monitor with its own characteristics. From the computer system's 100 point of view, each of the separate EDID™ files 202, 204 defines a differently configured display monitor, one with a digital interface and the other with an analog interface. This use of dual EDID™ files 202, 204 allows the computer system 100 to properly configure and initialize the dual-interface display monitor 184, regardless of which of the video connectors 181*a*, 181*b* has been connected to the video cable 183.

For each of the analog and digital monitor interfaces, the associated EDID file 202, 204, respectively, contains a 10-byte field defined as the Vendor/Product ID block in the EDID standard. The third- and fourth-least significant bytes of the Vendor/Product Identification block contain a 2-byte product identification code ("ID Product Code"). These two bytes, referred to herein as the ID Product Code 210 are a 2-byte vendor-assigned product code that is used to differentiate between different models from the same manufacturer. The ID Product Code 210 uniquely identifies the monitor but does not identify whether the digital or analog interface is to be used. In the preferred embodiment, the unique ID product code 210 for the monitor's digital interface is a different value than the ID product code 210 for the same monitor's analog interface.

The monitor 184 relays to the computer system 100 whether the monitor 184 should receive digital or analog video signals through the unique ID product code and the value of a Video Input Definition 212 in the EDID™ data structure. The Video Input Definition 212 is contained a 1-byte field contained in a 5-byte block of the EDID™ data structure known as the Basic Display Parameters and Features block. If the value of bit 7 in the Video Input Definition 212 is set to a binary "1", then digital video input is required. If the value of bit 7 in the Video Input Definition 212 is reset to binary "0", then analog input is required.

The monitor's DDC logic 214 includes circuitry that determines whether the cable 183 is connected to the digital video connector 181*b* or to the analog video connector 181*a*.

If the digital video connector 181*b* is connected, then the monitor sends the digital EDID™ file 204 to the computer system 100 when the computer system requests it. If, on the other hand, the analog video connector 181*b* is connected, the monitor 184 will send the analog EDID™ file 202 to the computer system 100 when requested.

Figure 3:
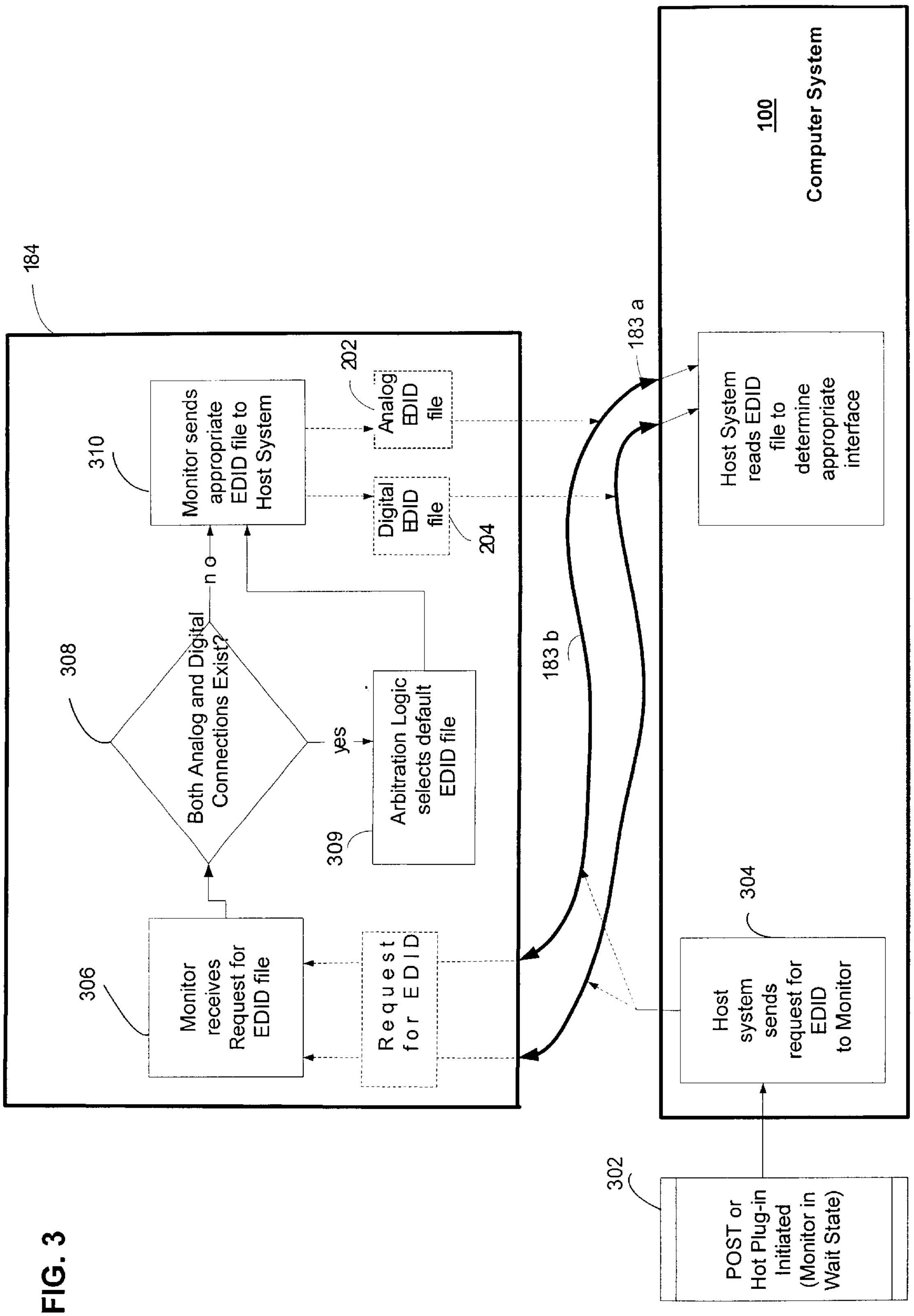
FIG. 3 is a functional diagram of a dual-monitor initialization process.

FIG. 3 illustrates that the monitor 184 and the computer system 100 together comprise a monitor identification and configuration system. At the time that monitor initialization begins 302, the monitor 184 is in a wait state. Initialization begins when an initiating event occurs. An initiating event can be a POST or a hot plug-in 302. An initiating event can also be any event which makes it desirable to re-initialize the monitor, such as a reboot. A reboot is a manner of restarting the operating system of a computer system 100 without removing power from the computer system. After an initiating event occurs, the computer system 100 sends a "request for EDID" file to the monitor 184 in operation 304. The request for EDID is relayed over the computer system's 100 single DDC™ channel and is routed to both the analog video connector 181*a* and the digital video connector 181*b*.

When the monitor 184 receives the request for EDID in operation 306, the monitor 184 transitions out of the wait state. In operation 308 the monitor 184 determines whether the both the analog video cable 183*a* and the digital video cable 183*b* are connected to the analog connector 181*a* and to the digital connector 181*b*, respectively. If only one video cable 183 is connected, the monitor sends, in operation 310 the EDID™ file 202, 204 corresponding to the connected cable 183. That is, if the video cable 183 is connected to the analog video connector 181*a*, then the monitor 184 sends to the computer system 100, in operation 310, the EDID™ file 202 corresponding to the monitor's analog interface (referred to herein as the "analog EDID™ file"). Similarly, if the video cable 183 is connected to the digital video connector 181*b*, then the monitor 184 sends to the computer system 100, in operation 310, the EDID™ file 204 corresponding to the monitor's digital interface (referred to herein as the "digital EDID™ file").

It is possible that the monitor 184 is connected to both the analog video connector 181*a* via the analog video cable 181*a* and to the digital video connector 181*b* via the digital video cable 183*b*. In the preferred embodiment, this "dual-connect" situation constitutes an anomalous condition. In an alternative embodiment, the "dual-connect" situation is anticipated as a feature of normal operation.

In operation 309 the monitor 184 checks for the "dual-connect" situation. If it exists, then the monitor's arbitration logic 214 chooses, in operation 309, a default EDID™ file. In the preferred embodiment the default EDID™ file is the digital EDID™ file 204. The monitor 184 therefore will receive digital video input if both the analog and digital video cables 181*a*, 181*b* are connected simultaneously. Based upon the determination made in operation 309, the monitor 184 sends the appropriate EDID™ file 202, 204 to the computer system 100 in operation 310.

In operation 312, the computer system 100 receives and reads the EDID™ file 202, 204. By evaluating the Video Input Definition 212 contained in the EDID™ file 202, 204 received in operation 312, the computer system 100 determines what type of video signals the monitor 184 requires. Accordingly, the computer system 100 thereafter sends either analog video signals or digital video signals, as required, to the monitor 184 through the video cable 183.

Figure 4:
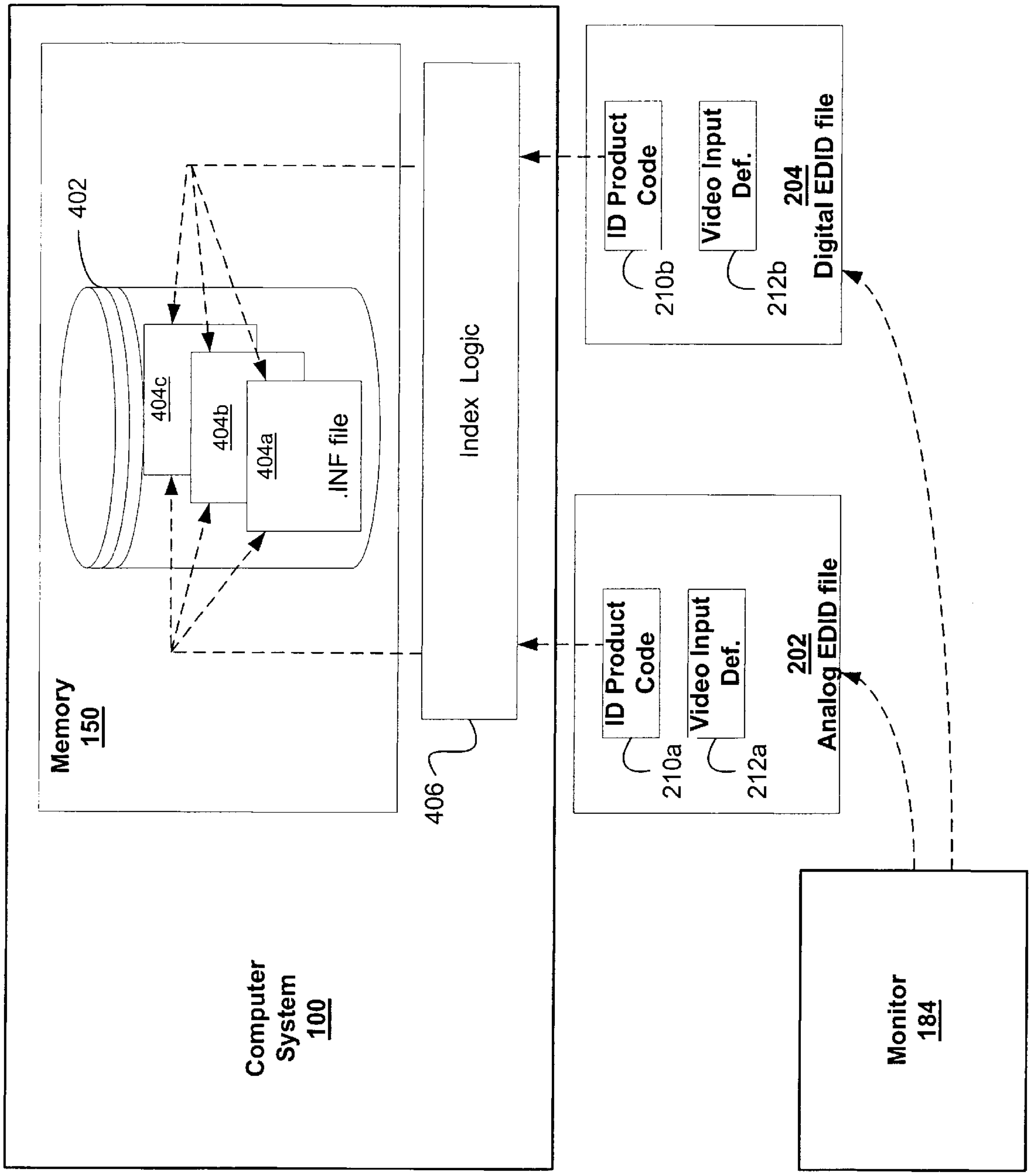
FIG. 4 is a block diagram of an information file indexing scheme.

FIG. 4 is relevant to a discussion of additional monitor-related processing that the monitor 100 performs after it receives the EDID™ file 202, 204. In at least one embodiment, the computer system 100 uses the ID product code 210 to index into a database 402 of expanded information about the monitor 184. That is, the EDID™ data structure does not contain all information about a monitor 184 that the computer system 100 displays to the user on the monitor screen upon POST or hot plug-in. For instance, the Product ID code 210 is only 2 bytes long, and therefore cannot contain the entire name of a monitor such as the "Dell Ultrascan P990"™. The computer system 100 therefore maintains additional information about the monitor 184 in a database 402 of information files 404*a*, 404*b*, 404*c* stored in the main memory 150. The information (".INF") files 404*a*, 404*b*, 404*c* contain information such as the full name of the monitor. Using the Product ID code 210, the computer system 100 generates an index that points to the .INF file 404*a*, 404*b*, 404*c* associated with the monitor 184.

Those skilled in the art will recognize that, based upon the teachings herein, several modifications may be made to the embodiments described above. For example, in an alternative embodiment the monitor 184 may be coupled to the analog video connector 181*a* and the digital video connector 181*b* simultaneously by a single dual-purpose analog/digital video cable 183. In this embodiment, the single cable 183 may be attached to a single dual-purpose analog/digital video connector. In such embodiments, the monitor 184 requires additional logic to determine which identification file (i.e., the analog EDID™ file 202 or the digital EDID™ file 204) to send to the computer system 100. In one approach, the monitor can send the digital EDID™ file 204 as a default. In another approach, the monitor receives and processes additional user input to determine which interface (analog v. digital) is the desired interface. The user input could come, for instance, from an exterior switch or button on the monitor 184.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A method for communicating monitor information between a monitor and a computer system, the computer system having a processor coupled to a memory and also having a digital video connector and an analog video connector, the monitor having an analog interface that receives analog video input, the monitor also having a digital interface that receives digital video input, comprising:

sensing whether an initiating event has occurred;

providing to the monitor, when the initiating event has occurred, a request for identification information;

determining if the monitor is connected to both the analog video connector and the digital video connector;

if the monitor is connected to both the analog video connector and the digital video connector:

selecting a default identification file, the default identification file being selected from a plurality of identification files, the plurality of identification files including an analog identification file and a digital identification; and providing the default identification file to the computer system; and providing to the computer system, if the monitor is not connected to both the analog video connector and the digital video connector, a particular identification file, a particular identification file, the particular identification file being included in the plurality of identification files.

2. The method, as recited in claim 1, further comprising:

using a product identification code to point to an information file associated with the monitor, the product identification code being included in the digital identification file and also being included in the analog identification file.

3. The method, as recited in claim 1, wherein providing the particular identification file to the computer system further comprises:

providing the analog identification file if the monitor is connected to the analog video monitor; and providing the digital identification file if the monitor is connected to the digital video monitor.

4. The method, as recited in claim 1, further comprising:

using the value of a video input definition to determine which of the analog video input and the digital video input to provide to the monitor, the video input definition being included in each of the plurality of identification files.

5. The method, as recited in claim 1, wherein the initiating event is a power on self test.

6. The method, as recited in claim 1, wherein the initiation event is a hot plug-in.

7. The method, as recited in claim 1, wherein the initiating event is a reboot.

8. The method, as recited in claim 1, wherein the request for identification information comprises a clock signal and a data signal.

9. The method, as recited in claim 1, wherein the default identification file comprises the digital identification file.

10. The method, as recited in claim 1, wherein the plurality of identification files further comprises a plurality of Extended Display Identification Data Standard (EDID) files;

the analog identification file includes an analog EDID file; and the digital identification file includes a digital EDID file.

11. The method, as recited in claim 1, wherein:

the plurality of identification files further comprises a plurality of Enhanced Extended Display Identification Data Standard (E-EDID) files;

the analog identification file includes an analog E-EDID file; and the digital identification file includes a digital E-EDID file.

12. A method for communicating monitor information between a monitor and a computer system, the computer system having a processor coupled to a memory and also having an analog video connector and a digital video connector, the monitor having an analog interface that receives analog video input, the monitor also having a digital interface that receives digital video input, comprising:

sensing whether an initiating event has occurred;

providing to the monitor, when the initiating event has occurred, a request for identification information;

receiving an identification file from the monitor, the identification file being one of a plurality of identification files associated with the monitor, the plurality of identification files including an analog identification file and a digital identification file, the identification file including a video input definition; and using the video input definition to determine which of the digital video input and the analog video input to provide to the monitor.

13. The method, as recited in claim 12, further comprising:

using a product identification code to generate an index that points to an information file associated with the monitor, the product identification code being included in the identification file.

14. The method, as recited in claim 12, wherein the plurality of identification files further comprises a plurality of Extended Display Identification Data Standard (EDID) files;

the analog identification file includes an analog EDID file; and the digital identification file includes a digital EDID file.

15. The method, as recited in claim 12, wherein:

the plurality of identification files further comprises a plurality of Enhanced Extended Display Identification Data Standard (E-EDID) files;

the analog identification file includes an analog E-EDID file; and the digital identification file includes a digital E-EDID file.

16. The method, as recited in claim 12, wherein the initiating event is a power on self test.

17. The method, as recited in claim 12, wherein the initiating event is a hot plug-in.

18. The method, as recited in claim 12, wherein the initiating event is a reboot.

19. The method, as recited in claim 12, wherein the request for identification information comprises a clock signal and a data signal.

20. A computer system comprising:

a processor;

a main memory coupled to the processor;

a monitor coupled to the processor, the monitor including an analog identification file and a digital identification file;

an analog video connector, the analog video connector being capable of being coupled to the monitor;

a digital video connector, the digital video connector being capable of being coupled to the monitor; and program code stored by the main memory and executable by the processor, wherein the program code includes instructions for:

sensing whether an initiating event has occurred;

providing to the monitor, when the initiating event has occurred, a request for identification information;

receiving a particular identification file; and using a video input definition to determine whether to provide to the monitor analog video input or whether to provide to the monitor digital video input, the video input definition being included in the particular identification file.

21. The system, as recited in claim 20, wherein the monitor includes logic for:

receiving the request for identification information;

determining if the monitor is connected to both the analog video connector and the digital video connector;

if the monitor is connected to both the analog video connector and the digital video connector:

selecting a default identification file, the default identification file being included in a plurality of identification files, the plurality of identification files including the analog identification file and the digital identification file; and providing the default identification file to the processor; and providing to the processor, if the monitor is not connected to both the analog video connector and the digital video connector, a particular identification file, the particular identification file being included in the plurality of identification files.

22. The system, as recited in claim 20, wherein the program code further includes instructions for using a product identification code to point to an information file associated with the monitor, the product identification code being included in the particular identification file.

23. The system, as recited in claim 21, wherein the logic for providing a particular identification file further comprises:

providing the analog identification file if the monitor is connected to the analog video connector; and providing the digital identification file if the monitor is connected to the digital video connector.

24. The system, as recited in claim 20, wherein the initiating event is a power on self test.

25. The system, as recited in claim 20, wherein the initiating event is a hot plug-in.

26. The system, as recited in claim 20 wherein the initiating event is a reboot.

27. The system, as recited in claim 20, wherein the request for identification information comprises a clock signal.

28. The system, as recited in claim 21, wherein the default identification file comprises the digital identification file.

29. The system, as recited in claim 21, wherein the plurality of identification files further comprises a plurality of Extended Display Identification Data Standard (EDID) files;

the analog identification file includes an analog EDID file; and the digital identification file includes a digital EDID file.

30. The system, as recited in claim 21, wherein:

the plurality of identification files further comprises a plurality of Enhanced Extended Display Identification Data Standard (E-EDID) files;

the analog identification file includes an analog E-EDID file; and the digital identification file includes a digital E-EDID file.

31. An apparatus, comprising:

a means for sensing whether an initiating event has occurred;

a means for providing to a dual-interface monitor, when the initiating event has occurred, a request for identification information;

a means for receiving a particular identification file;

a means for using a video input definition to determine whether to provide to the monitor analog video input or whether to provide to the monitor digital video input, the video input definition being included in the particular identification file;

a means for determining whether the monitor is connected to both an analog video connector and a digital video; and a means for selecting a default identification file if the monitor is connected to both the analog video connector and the digital video connector, the default identification file being included in a plurality of identification files, the plurality of identification files including an analog identification file and a digital identification file;

a means for providing the default identification file to a computer system if the monitor is connected to both the analog video connector and the digital video connector;

a means for providing to the computer system a particular identification file, if the monitor is not connected to both the analog video connector and the digital video connector, the particular identification file being included in the plurality of identification files.

32. An apparatus, comprising:

a means for sensing whether an initiating event has occurred;

a means for providing to a dual-interface monitor, when the initiating event has occurred, a request for identification information;

a means for receiving a particular identification file comprising:

a means for providing the analog identification file if the monitor is connected to the analog video connector; and a means for providing the digital identification file if the monitor is connected to the digital video connector; and a means for using a video input definition to determine whether to provide to the monitor analog video input or whether to provide to the monitor digital video input, the video input definition being included in the particular identification file.

33. An apparatus, comprising:

a means for sensing whether an initiating event has occurred;

a means for providing to a dual-interface monitor, when the initiating event has occurred, a request for identification information;

a means for receiving a particular identification file; and a means for using a video input definition to determine whether to provide to the monitor analog video input or whether to provide to the monitor digital video input, the video input definition being included in the particular identification file;

wherein:

the particular identification file further comprises:

an analog identification file having an analog Extended Display Identification Data Standard (EDID) file; and a digital identification file having a digital EDID file.

34. An apparatus, comprising:

a means for sensing whether an initiating event has occurred;

a means for providing to a dual-interface monitor, when the initiating event has occurred, a request for identification information;

a means for receiving a particular identification file; and a means for using a video input definition to determine whether to provide to the monitor analog video input or whether to provide to the monitor digital video input, the video input definition being included in the particular identification file;

wherein:

the particular identification file further comprises:

an analog identification file having an analog Enhanced Extended Display Identification Data Standard (EDID) file; and a digital identification file having a digital EDID file.

35. The apparatus, as recited in claim 31, wherein the initiating event is a power on self test.

36. The apparatus, as recited in claim 31, wherein the initiating event is a hot plug-in.

37. The apparatus, as recited in claim 31, wherein the initiating event is a reboot.

38. The apparatus, as recited in claim 31, wherein the request for identification information comprises a clock signal.

* * * * *